United States Patent [19]

Sparke

[11] Patent Number: 5,096,254
[45] Date of Patent: Mar. 17, 1992

[54] VEHICLE BODY AND METHOD OF MANUFACTURE

[75] Inventor: Laurence J. Sparke, North Balwyn, Australia

[73] Assignee: General Motors-Holden's Automotive Limited, Port Melbourne, Australia

[21] Appl. No.: 619,965

[22] Filed: Nov. 30, 1990

Related U.S. Application Data

[63] Continuation-in-part of Ser. No. 371,288, Jun. 26, 1989, abandoned.

[30] Foreign Application Priority Data

Jun. 30, 1988 [AU] Australia .................. PI9119

[51] Int. Cl.$^5$ .............................. B62D 25/04
[52] U.S. Cl. .................. 296/193; 296/96.21; 296/196; 296/201; 296/202; 296/203; 296/205
[58] Field of Search ............... 296/201, 202, 203, 205, 296/193, 196, 197, 96.21

[56] References Cited

U.S. PATENT DOCUMENTS

| | | | |
|---|---|---|---|
| 2,248,319 | 7/1941 | Waterhouse, Jr. | 296/203 X |
| 4,428,599 | 1/1984 | Jahnle | 296/203 X |
| 4,649,669 | 3/1987 | Okamoto et al. | 296/201 X |
| 4,653,801 | 3/1987 | Shirasu et al. | 296/202 |
| 4,826,238 | 5/1989 | Misono et al. | 296/205 X |
| 4,842,326 | 6/1989 | DiVito | 296/196 |

FOREIGN PATENT DOCUMENTS

| | | | |
|---|---|---|---|
| 3413228 | 10/1985 | Fed. Rep. of Germany | 296/202 |
| 3540814 | 5/1987 | Fed. Rep. of Germany | 296/196 |
| 3720344 | 1/1989 | Fed. Rep. of Germany | 296/203 |
| 2581951 | 11/1986 | France | 296/196 |

Primary Examiner—Margaret A. Focarino
Assistant Examiner—Andrew C. Pike
Attorney, Agent, or Firm—Stevens, Davis, Miller & Mosher

[57] ABSTRACT

The invention relates to the construction of motor vehicle bodies. The vehicle bodies are constructed from a lower section formed of pressed metal panels connected together, and an upper section formed of frame elements. The lower section functions as a primary strength imparting component of the vehicle body, and the upper section functions as a primary style imparting component of the body. The configuration of the upper section can be varied by varying the arrangement of configuration of the frame elements so that the style of the vehicle body can be varied without necessitating a change to the lower section. The lower section will thus remain substantially unchanged for a range of vehicle styles or models.

10 Claims, 6 Drawing Sheets

VEHICLE BODY AND METHOD OF MANUFACTURE

This application is a Continuation-in-Part of application Ser. No. 371,288, filed June 26, 1989, now abandoned.

INTRODUCTION

This invention relates to the construction of vehicle bodies and more particularly, although not exclusively to the construction of motor car bodies. It will be convenient to hereafter describe the invention with particular reference to chassisless passenger cars, and whilst that is considered to be the major use for the invention, the invention does have wider application.

BACKGROUND TO THE INVENTION

Motor car bodies are conventionally manufactured using preformed pressed panels, the panels being joined together by welding or other means to form a sufficiently rigid and strong structure onto which a roof panel, doors, engine, suspension, and like components can be mounted. The pressed panels which make up the bodies are shaped to conform with the style or model of motor car to be manufactured and different models of car generally use differently shaped panels to form the body. Thus, for example, an estate car and a four door car of the same basic type and model will be formed of completely differently shaped side panels, even though the lower portions of the two cars are identical.

The press machines and associated dies therefor used for producing individual panels are very costly and accordingly, in order to recoup the capital costs of those machines and die tools, it is necessary for car manufacturers to produce large numbers of cars from the same press. This factor works against the introduction of lower volume models as the lower volumes simply do not recoup the outlayed capital costs.

In an attempt to decrease the costs of tooling, the industry has looked towards plastic or other low cost material dies. Plastic dies are indeed less expensive than corresponding metal dies and it is, in some circumstances, possible to use plastic die parts rather than the more expensive metal die parts. Plastic parts do not, however, last as long as metal parts and accordingly plastic tools are only suitable for shorter production runs. Clearly, if it is known that a particular model of car will only be made in low numbered runs then it is appropriate to use plastic die tooling. However, if it turns out that there is a need to extend the particular run then, where plastic tooling has been used, this is not always possible. Whatever material is adopted for die tooling, the cost of tooling is expensive and adds significantly to the cost of vehicles and detracts from manufacturers' discretion to change models in response to market demands.

SUMMARY OF THE INVENTION

It is an object of this invention to provide a method of manufacturing vehicle bodies which minimises the problems of high cost and lack of manufacturer's discretion referred to above. A further object of the invention is to provide a vehicle manufactured using the method.

The invention is directed to a method of manufacturing a motor vehicle body which includes the steps of forming a lower section of the body from a plurality of interconnected panels, and an upper section of the body from a plurality of frame elements. The relative strengths and configurations of the two sections are such that the lower section functions as a primary strength imparting component of the body, while the upper section functions as a primary style imparting component of the body. The form of the lower section is such that a variety of configurations of upper sections can be connected to the lower section. The upper section of the vehicle body is, for motor cars, preferably that part of the body above the plane which includes the bonnet of the vehicle body. The upper section may thus take the form of a sub-frame position of the central door pillar, can be varied to suit styling requirements and the lower section is applicable to various styles substantially without change.

The frame members can be connected together before connection to the lower section, or they can be progressively built onto the lower section, as required. The lower section, however, will be of sufficient strength in order to strengthen and rigidify the upper section. Thus, the panels which comprise the lower section will act as an integral or composite unit which will give structure and strength to the whole vehicle body.

Although it is appreciated that the lower section of the body will impart some features of style to the vehicle body, it is submitted that the upper section will impart the primary style features to the vehicle body. There will be a basic styling characteristic brought into the lower section, but overall style variations will be left primarily to the upper section. That is, at least the principal variations for that purpose will be variations of configuration and arrangement of the upper section.

BRIEF DESCRIPTION OF THE DRAWINGS

The preferred method of the invention, and an embodiment of a vehicle body made in accordance with the invention, will now be described by way of example, reference being made to the accompanying drawings. Clearly the drawings depict but one example of the vehicle body, and the style or constructional features of that vehicle body are not intended to impose a limit on the ambit of the invention.

DETAILED DESCRIPTION OF THE PREFERRED EMBODIMENT

Figure 1:
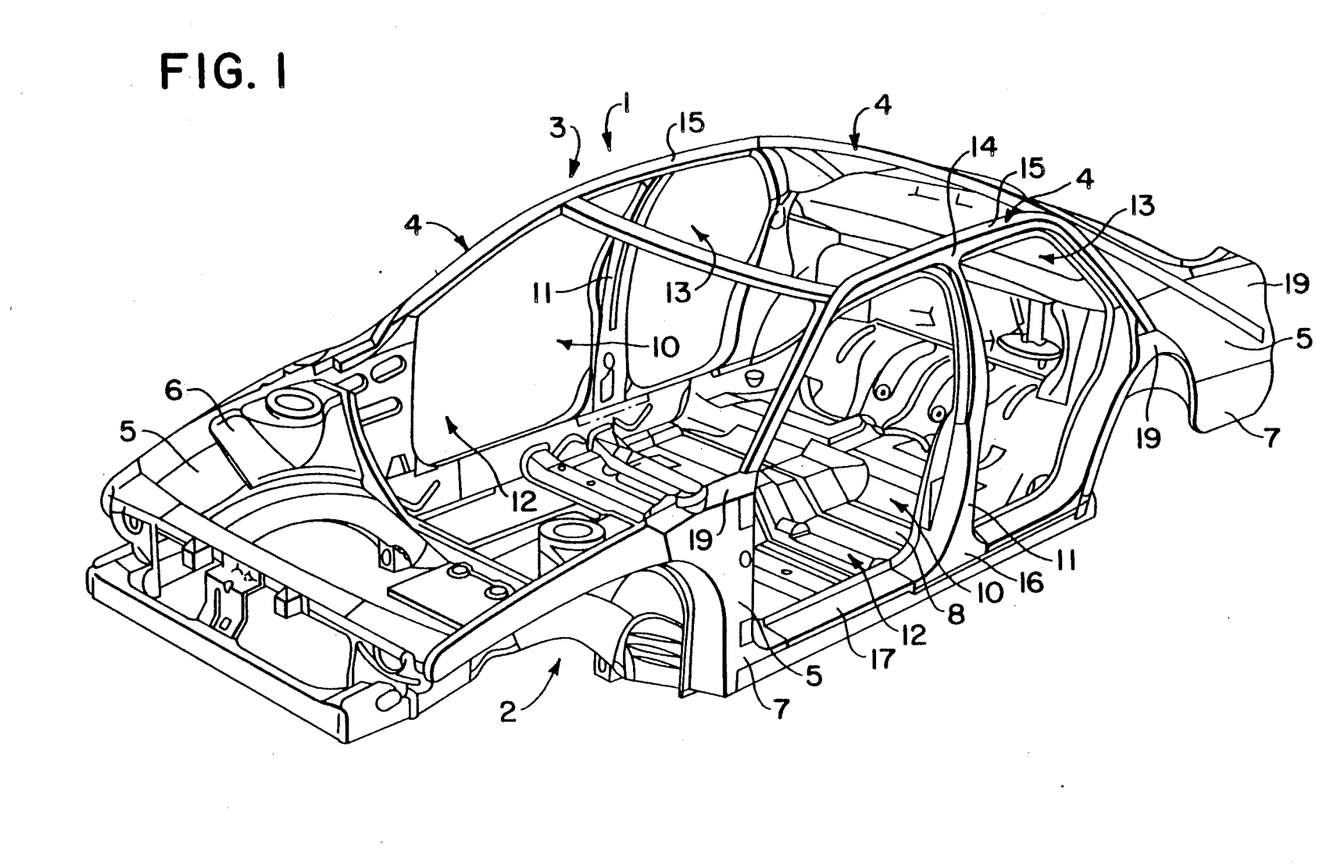
FIG. 1 shows a perspective view of a vehicle body made in accordance with the invention.

Referring to FIG. 1, a vehicle body 1 is shown which comprises a lower section 2 and an upper section 3. The upper section 3 consists of a plurality of frame elements 4 connected together. Preferably the frame elements are connected together by a welding process. Each individual frame element 4 is bent, twisted, or otherwise configured so that when assembled into the upper section 3 it will correctly conform to the shape of that upper section. It is preferred that the frame elements 4 are manufactured from uniform cross-section tubular material as described in more detail herebelow.

The lower section of the vehicle body is formed from a plurality of pressed metal panels 5 using conventional press and die tooling and panel forming techniques. Generally, the lower section 2 sill be formed having an inner skin 6 and an outer skin 7 and the two skins will be connected together by means of spot-welding or like technique. The vehicle body also has a floor 8 which is likewise formed of pressed metal panels and holds the two sides of the body together. The panels 6, 7, and 8 when fixed together form a high strength structure to which the motor, suspension, decorative panels, and other components of the vehicle can be mounted. The upper section 3 can thus be mounted to the lower section 2 and the high strength of the lower section 2 will serve to strengthen and rigidify the upper section 3 by providing a firm foundation for the upper section 3.

Each side of the vehicle body has a large opening therein indicated at numeral 10, the openings 10 serving as door openings for the vehicle. A central pillar 11 is situated in each of these foor openings 10 and the location of the central pillars 11 within the door openings 10 is one feature which affects the style of the vehicle body 1. For example, if the central pillar 11 is located towards the centre of the door opening 10 as shown in FIG. 1, front door openings 12 and rear door openings 13 will be defined, separated by the central pillar 11 in each side. However, if the central pillar is moved towards a rear of the vehicle body, the rear openings 13 will become too small to have doors located therein and the front door openings 12 will be larger openings thereby allowing for a two-door motor car design wherein the doors are of a larger size than would be the case for a similar four-door construction.

The form of the central pillar 11 can be identical for different models, but the position thereof relative to the remainder of the body may vary as mentioned above, depending on the actual model being assembled. In a preferred form of the invention the central pillar 11 is slidable within the openings 10 to a selected position within those openings thereby providing a facility for easily moving the central pillar relative to the remainder of the vehicle body 1. Preferably the central pillar 11 has an upper end 14 which is of T-shaped configuration having a cross-piece which engages with and is slidable relative to a frame member 15 which forms part of the upper section 3. A lower end 16 of the central pillar may be of inverted channel-shaped configuration and be slidable on a rail 17 which forms the lower edge of the door opening 10. After the central pillar 11 has been located within the door opening 10 it can be moved backwards or forwards of the central position by sliding longitudinally along the rail 17 and, once it is in its correct position, affixed in that Position by means of welding, riveting, or other suitable fastening techniques. Thus, the upper end 14 of the central pillar 11 will be secured to the member 15 of the upper section 3 and the lower end 16 of the central pillar will be affixed to the rail 17 on the lower section 2.

Figure 9:
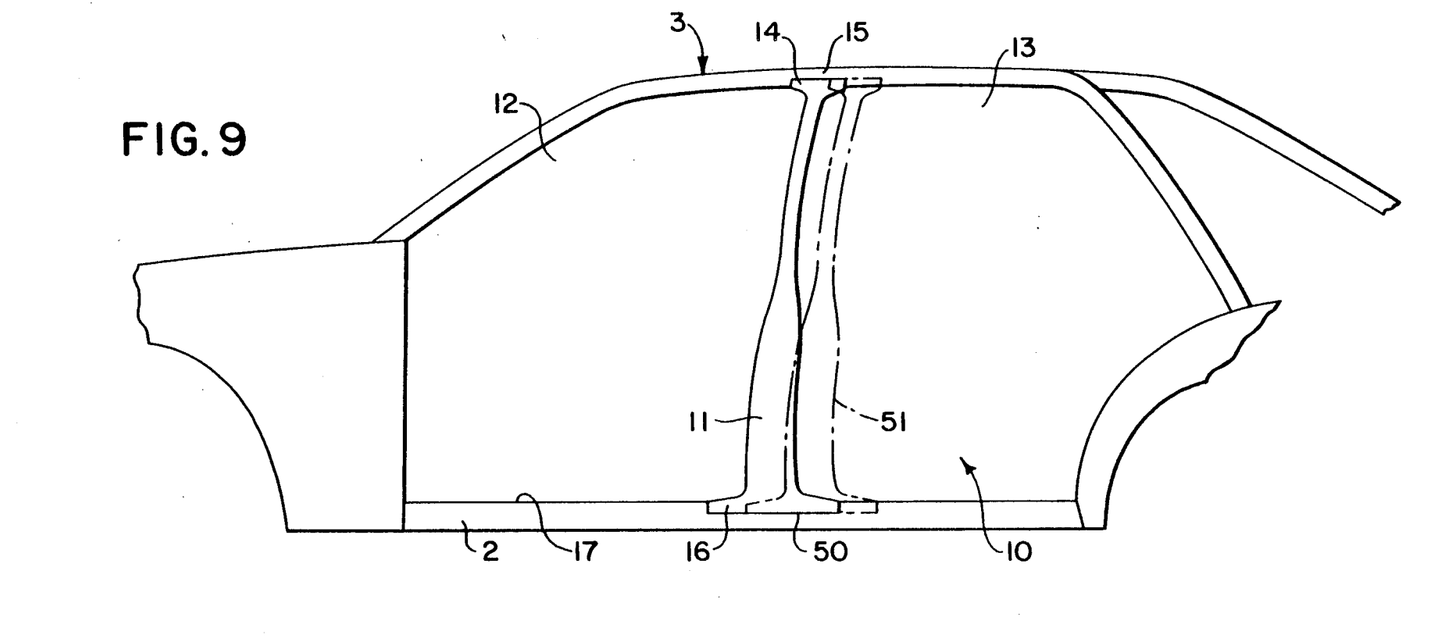
FIG. 9 shows a diagrammatic side view of a vehicle depicting different positions of a door pillar.

FIG. 9 shows diagrammatically how the central pillar 11 can be shifted longitudinally within the door opening 10. As shown the pillar 11 can be located in a central position as indicated by numeral 50 which is suitable for a four door type vehicle. Dotted lines 51 depict an alternative position for the central pillar 11, that is, towards the rear of the vehicle, and the position indicated at 51 is suitable for two door type vehicles. Different positions for the pillar 11 to those indicated at 50 and 51 may be selected for different styles of upper section 3 as dictated by design considerations.

Clearly it may be necessary to adapt presently used pressed panel bodies to some extent to accommodate the framed upper section of the vehicle body according to the invention. In particular, it may be necessary to increase the strength of the lower section in order that the completed vehicle body is of comparable strength to those presently being used. Also, the lower section may need to have increased strength in regions, indicated at numeral 19 in FIG. 1 where the upper structure attaches to the lower structure.

Once the upper section 3 has been affixed to the lower section 2 it will be necessary to attach roof panels and glass windows to the upper section. Generally the panels attached to the upper section will be relatively light-weight, nonload-bearing panels and will serve simply to enclose the passenger space within the vehicle rather than serve any load-bearing function.

Figure 2:
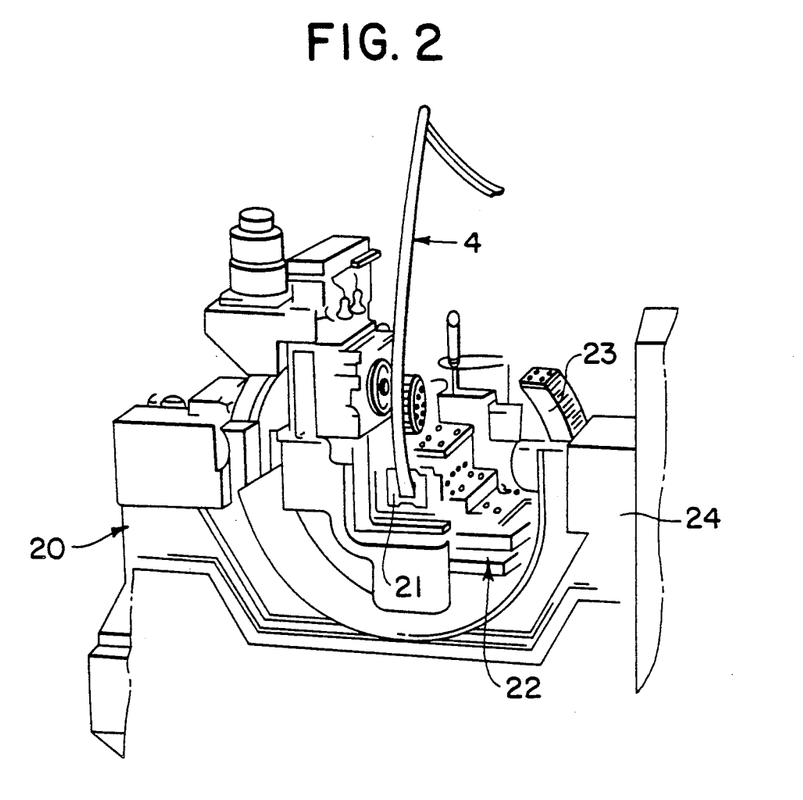
FIG. 2 shows a perpestive view of a bending machine for bending frame elements.

As previously mentioned, the frame elements 4 which make up the upper section 3 will be bent and/or twisted by means of a suitable bending machine. Such machine is depicted diagrammatically in FIG. 2 of the drawings and is indicated by numeral 20. As shown in FIG. 2, a frame element 4 is passed through a central passage 21 in the machine 20 and the machine includes a cradle 22 supported on an arcuate beam 23 which can be rotated relative to the base 24 of the machine. The frame element 4 is held within the central passage 21 in a manner such that by varying the position of the cradle 22 relative to the base 24 the configuration of the frame element passing through the central passage 21 can be varied. Clearly, the frame element 4 will be automatically fed through the passage 21. The frame material will be provided in extended lengths and individual elements 4 will be cut from the lengths and bent to the required configuration automatically by the machine 20. It is envisaged that the machine 20 will be computer-controlled and thus a multiplicity of identical frame elements will be automatically produced by the machine. The machine 20 is of known design although the use of the machine for producing frame elements for motor vehicles is considered to be novel.

Figure 3:
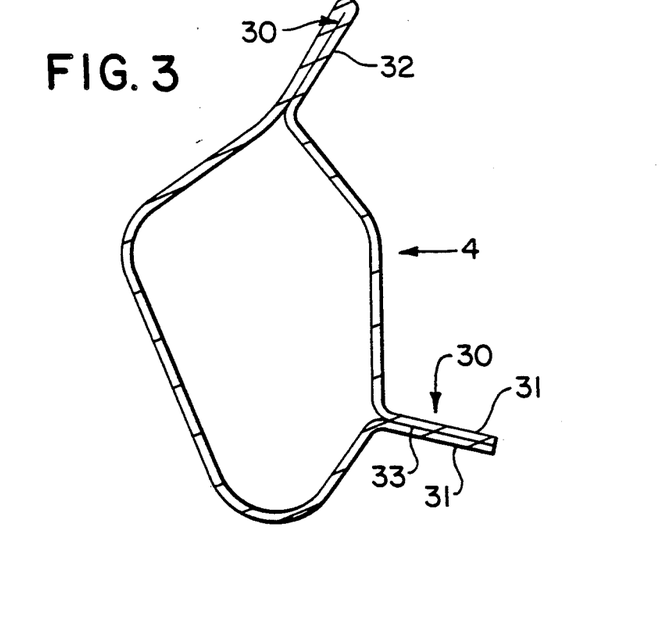
FIG. 3 shows a cross-sectional view through a framed element along line III—III of FIG. 5.

Although the invention is not limited to any particular cross-sectional form of frame element 4 for use in construction of the upper section 3 it is preferred that the frame element is of non-circular cross-sectional shape similar to the shape shown in FIG. 3. The element 4 shown has two flanges 30 which extend the length of the frame element 4 and extend outwardly from the outer surface of that element. Preferably the tubular length is formed using a rolling process to roll a strip of material into tubular form as indicated in FIG. 3, and the two edges 31 of that strip meet to define one of the flanges 30. The other flange 32 may be formed by folding a fold into the strip intermediate its edges and flattening the fold to thereby define the flange 32. The two flanges 30 may each lie in a plane, the two planes forming an included angle between them of approximately 90° from their line of intersection.

Figure 4:
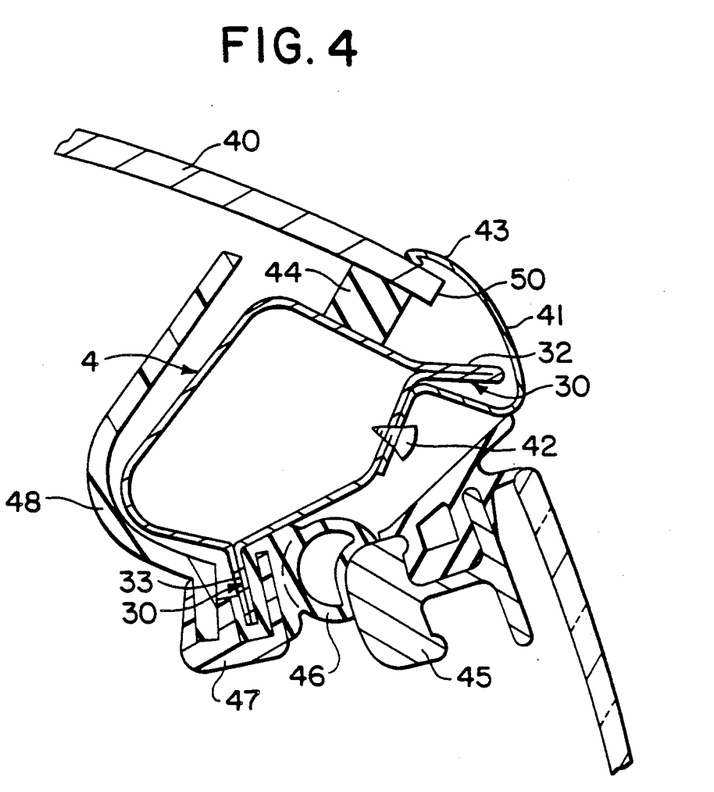
FIG. 4 shows a cross-sectional view through a framed element of a motor vehicle body along line IV—IV of FIG. 7 once doors and panels have been fitted to the body.

FIG. 4 depicts an arrangement wherein panels and interior trim are attached to the frame elements. As shown in FIG. 4, a frame element 4 has a roof panel 40 attached thereto by a clip 41. The clip 41 is secured to the frame element 4 by means of screw fasteners 42 and the clip 41 has a resilient arm 43 which overlies the edge of the roof panel 40 to press the roof panel 40 against the frame element 4 thereby holding the roof panel against the frame element 4. Preferably an elastomeric seal 44 is interposed between the frame element 4 and an underside of the roof panel 40 to thereby form a seal between the roof panel 40 and the frame element 4 and also to ensure that the roof panel 40 seats properly against the frame element 4. The clip 41 preferably extends the length of the frame element 4 in the manner of a bead thus ensuring that the edge 50 of the roof panel 40 is neatly hidden behind the resilient arm 43 of the clip 41. The clip 41 passes around the flange 32 and thus the flange 32 serves as an eave and provides support for the edge region of the roof of the motor vehicle. The flange 33 extends in a substantially downward direction and in use provides an abutment against which the door frame 45 can bear when the door of the vehicle is closed. A seal 46 is fitted to the frame element 4 and is held in position by beading 47 which also serves to hold interior panelling 48 in position agains the inside of the frame element 4.

Figure 5:
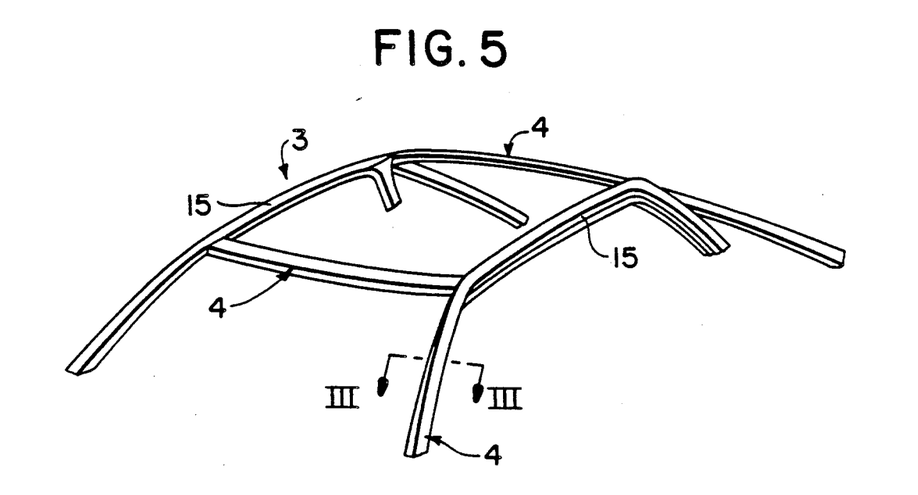
FIG. 5 shows a perspective view of an assembled upper section of a motor vehicle body suitable for fixing to a lower section formed of pressed panels.

FIG. 5 shows an assembled vehicle upper section 3 prior to being affixed to a lower structure. It is preferred that the upper section 3 is assembled as a frame unit prior to mounting to the lower section 2. Clearly it will be possible for there to be different cross-sectional forms of frame elements, and individual elements may differ in cross-sectional form. The frame element 4 described above is one form which is considered suitable but is certainly not the only form with which the invention can be used.

Figure 6:
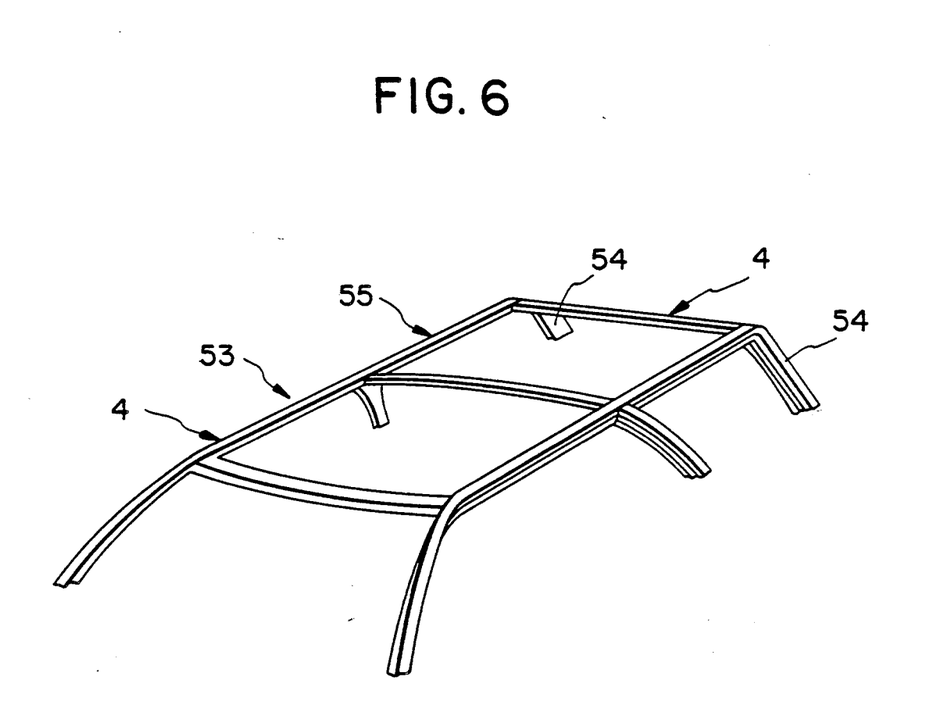
FIG. 6 shows a perspective view of a differently shaped assembled upper section formed of framed elements, and suitable for the construction of an estate type vehicle.

FIG. 6 shows an alternative assembly 53 of frame elements 4 suitable for the construction of an estate type vehicle. This assembly 53 includes rear pillars 54 wich will provide support for the rear part 55 of the assembly 53. This assembly 53 will be suitable for mounting to a lower section 2 of the type depicted in FIG. 1 so that an estate vehicle can be constructed by combining the assembly 53 with the lower section 2. Since the lower section 2 is the major cost component of the vehicle body thus constructed the cost of varying vehicle types is reduced by providing the capacity of a range of styles using only a single pressed panel body assembly.

Figure 7:
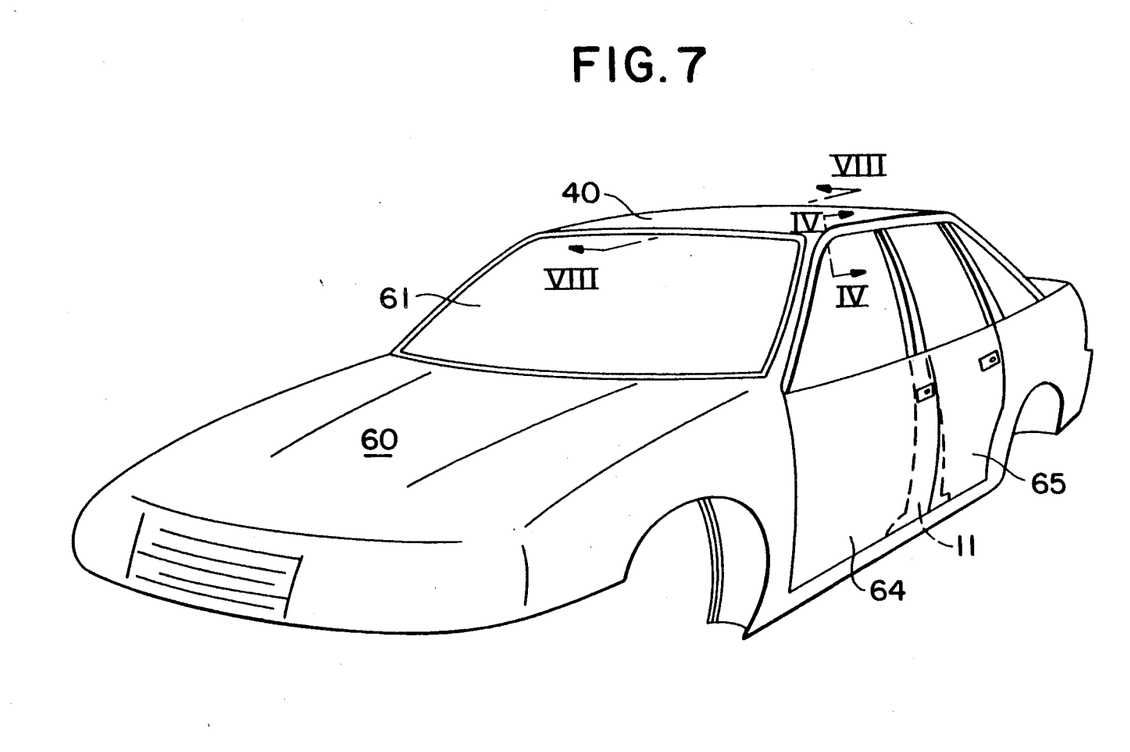
FIG. 7 shows a perspective view of a vehicle, similar to that shown in FIG. 1, but with windows, doors and additional panels affixed thereto.
Figure 8:
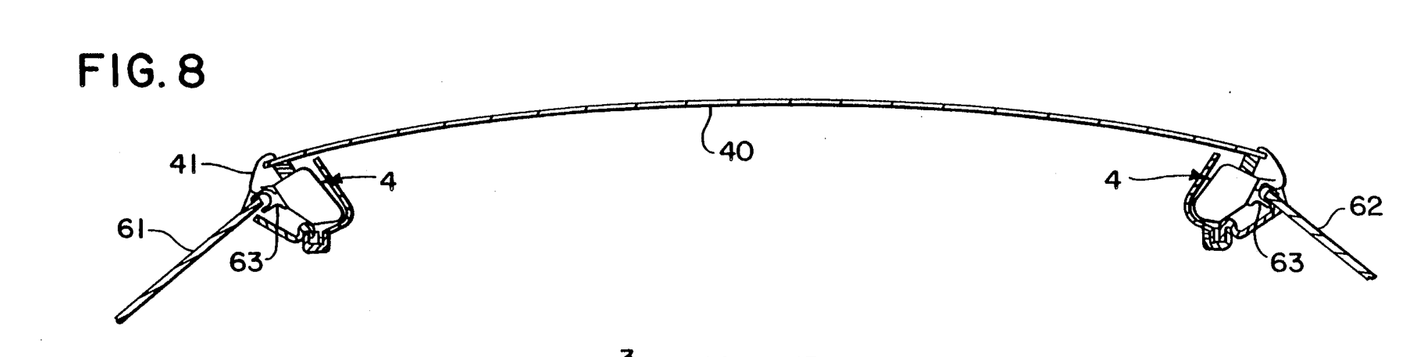
FIG. 8 shows a sectional view along line VIII—VIII of FIG. 7.

FIGS. 7 and 8 show the vehicle body 1 of FIG. 1 at a later stage in the construction process. The vehicle body is shown having a bonnet 60, a roof panel 40, a front windscreen 61, and a rear windscreen 62. The roof panel 40 is held to the frame elements 4 by means of clips 41, and the two windscreens are held in position by clips 63. The vehicle body has front and rear doors 64 and 65 on either side of the central pillar 11.

It will be appreciated that many advantages flow from employing a framed upper section manufactured using techniques as described above. The form of that upper section can be varied significantly with relatively minor corresponding variations being made to the lower section. All that will be necessary to vary the form of the upper structure will be to alter the bending cycle of the machine used for bending the frame elements and thereafter preparing suitably formed panels and window glass to correspond with the new upper section. The lower section will be the major strength providing component for the body and will remain substantially unaltered for different model forms and styling changes. This means that the present die machines for producing the lower section will continue to produce panels for the lower section for a large number of vehicles. The upper section which serves as the primary style imparting component of the vehicle can be altered by simply causing the bending machine which produces the frame elements to produce differently configured frame elements. Clearly, where the bending machine is computer-controlled, a simple change of programme will be all that will be necessary in order to change the configuration of individual frame elements and thus a single machine can be used to provide a variety of differently formed upper sections having a range of styles of motor vehicles without any significant capital cost necessary for changes in tooling and dies.

The ability to easily alter the model of a vehicle will enable the manufacturer of vehicles to adapt the models being manufactured in accordance with market demand rather than needing to be concerned about having sufficiently large production runs in order to recoup the capital cost of tooling. It will also be a simple matter to produce a large range of vehicles styles without any major capital cost demands since the basic lower section will remain unaffected for the whole range of designs. The major cost in die tooling changes which conventionally accompanies model changes will thus not be present.

It is to be understood that various alterations, modifications, and/or additions may be introduced into the constructions and arrangements of parts previously described without departing from the spirit or ambit of the invention as defined by the appended claims.

Having now described my invention, what I claim as new and desire to secure by Letters Patent is:

1. A method of manufacturing a motor vehicle body including the steps of:
   forming a lower section of said body predominantly from a plurality of interconnected panels,
   selecting a style of vehicle body from a plurality of possible styles,
   bending a plurality of frame elements, said frame elements being connectable together to form a particular shape of upper section of said vehicle body, said shape of the upper section being reflective of the selected style of vehicle body,
   arranging and interconnecting said frame elements to form said particular shape of upper section,
   interconnecting said lower and upper sections together to form a body structure in which said lower section functions as a primary strength imparting component, and said upper section functions as a primary style imparting component, said lower section being of a form such that a range of different upper sections can be connected thereto, each of said range of different upper sections being reflective of one of the possible styles of motor vehicle body, said upper and lower sections together defining door openings on opposite sides of said body,
   selecting a door pillar for location in each respective door opening, selecting a position from a number of possible positions for said door pillars within each said door opening, each said possible position being longitudinally spaced apart from the other said positions, locating said door pillars at each respective position by approximately longitudinally rectilinearly sliding said door pillars within the respective said door openings, fixing a lower end of each said door pillar to said lower section, and fixing an upper end of each said door pillar to said upper section to thereby secure each said door pillar in the selected position thereof.

2. A method according to claim 1 wherein the lower ends of said door pillars each has an inverted channel-shape, said lower section forms a guide-rail over which said channel-shaped lower end locates, and said step of locating said door pillars in position comprises sliding each said lower end longitudinally along a respective said guide-rail to said selected position.

3. A method according to claim 1 which further includes the step of affixing windows and body panels to said upper section by means of clips, said clips each comprising a mounting portion by means of which the clip is secured to one of the frame elements, and a retaining portion for retaining the respective windows and body panels in position.

4. A method according to claim 1 wherein said bending of the frame elements is carried out by a computer-controlled bending machine.

5. A vehicle body including a lower fixed body section having a predetermined arrangement and configuration which is substantially consistent for various vehicle styles, said lower section being formed predominantly from a plurality of interconnected panels, an upper variable body section including a frame, the arrangement and configuration of which can be varied to suit different style requirements, said frame being composed of a plurality of interconnected frame elements, said variable section being connected to said fixed section in any one of possible variations thereof to combine therewith to form a body structure, said fixed section forming a primary strength imparting component of said structure and said variable section forming a primary style imparting component of said structure, at least one door opening provided in each of two opposite sides of said body, a door pillar mounted within each said door opening by movement within the respective said opening to adopt a selected position therein, said movement involving approximate longitudinal rectilinear sliding movement within the respective said opening, each said door pillar being secured at a respective said selected position by being secured at an upper end thereof to said upper section, and at a lower end thereof to said lower section.

6. A vehicle body according to claim 5 wherein a lower edge of each said door opening is formed by a rail which comprises part of said lower section, an inverted channel formation is provided on said lower end of each said door pillar, and each said channel formation slidably engages a respective said rail and is movable there along to vary the position of the respective said door pillar prior to securing that door pillar to said upper and lower sections.

7. A vehicle body according to claim 5 wherein the upper section includes at least one body panel connected to the frame, said body panel being relatively light and of a non-load bearing nature.

8. A vehicle body according to claim 7 wherein said body panel is secured to said frame elements by means of clips which include a resilient portion which holds said body panel against said frame elements.

9. A vehicle body according to claim 5 wherein said frame elements are comprised of non-circular tubular elongate lengths having at least one outwardly directed flange extending the length of the frame element.

10. A vehicle body according to claim 9 wherein there are two such outwardly extending flanges and each said flange is integrally formed with the frame element.

* * * * *